United States Patent
Andou et al.

(10) Patent No.: US 6,821,430 B2
(45) Date of Patent: Nov. 23, 2004

(54) METHOD OF TREATING REVERSE OSMOSIS MEMBRANE ELEMENT, AND REVERSE OSMOSIS MEMBRANE MODULE

(75) Inventors: Masaaki Andou, Ibaraki (JP);
Terutaka Watanabe, Ibaraki (JP);
Masahiko Hirose, Ibaraki (JP); Hisao Hachisuka, Ibaraki (JP); Mark Wilf, Oceanside, CA (US); Craig Bartels, Oceanside, CA (US); Keith Andes, Oceanside, CA (US)

(73) Assignees: Nitto Denko Corporation, Ibaraki (JP); Hydranatics, Oceanside, CA (US)

( * ) Notice: Subject to any disclaimer, the term of this patent is extended or adjusted under 35 U.S.C. 154(b) by 0 days.

(21) Appl. No.: 10/245,713

(22) Filed: Sep. 18, 2002

(65) Prior Publication Data

US 2003/0066805 A1 Apr. 10, 2003

(30) Foreign Application Priority Data

Sep. 20, 2001  (JP) ........................................ 2001-287573

(51) Int. Cl.$^7$ ............................................. B01D 61/00
(52) U.S. Cl. .................... 210/636; 210/652; 210/321.6; 210/321.74; 210/500.38; 210/653; 264/48
(58) Field of Search ................................. 210/636, 490, 210/652, 653, 321.6, 321.74, 500.38; 264/48

(56) References Cited

U.S. PATENT DOCUMENTS

| | | | |
|---|---|---|---|
| 3,551,331 A | | 12/1970 | Cescon et al. ................. 210/23 |
| 4,277,344 A | * | 7/1981 | Cadotte ....................... 210/654 |
| 4,761,234 A | * | 8/1988 | Uemura et al. |
| 4,792,404 A | * | 12/1988 | Swedo et al. ................. 210/654 |
| 4,872,984 A | | 10/1989 | Tomaschke ............. 210/500.38 |
| 4,988,444 A | * | 1/1991 | Applegate et al. |
| 5,152,901 A | * | 10/1992 | Hodgdon |
| 5,674,398 A | * | 10/1997 | Hirose et al. |
| 5,733,602 A | | 3/1998 | Hirose et al. ................ 427/245 |
| 6,171,497 B1 | * | 1/2001 | Hirose et al. |
| 6,464,873 B1 | | 10/2002 | Tomaschke ............. 210/500.38 |

FOREIGN PATENT DOCUMENTS

| | | |
|---|---|---|
| EP | 1 136 116 | 9/2001 |
| JP | 2-187135 | 7/1990 |
| JP | 8-224452 | 9/1996 |
| JP | 10-309588 | 11/1998 |
| JP | 11-104470 | 4/1999 |
| JP | 2001-25648 | 1/2001 |
| JP | 2001-259388 | 9/2001 |
| WO | WO 02/064509 | 8/2002 |

OTHER PUBLICATIONS

Chang, R. "The Effects of Small Halocarbons on RO Membrane Performance", *Desalination*, vol. 85, (Sep. 1991) pp. 33–44, (Elsevier Science Publishers B.V.).

* cited by examiner

*Primary Examiner*—Ana M. Fortuna
(74) *Attorney, Agent, or Firm*—Westerman, Hattori, Daniels & Adrian LLP

(57) ABSTRACT

In the treatment, a reverse osmosis membrane element having a polyamide skin layer is loaded in a pressure vessel in a membrane separator and contacted with a bromide-containing aqueous solution of free chlorine. The thus treated reverse osmosis membrane element retains for a long time its effect of reducing solute concentration in a solution treated with the reverse osmosis membrane and rejects efficiently non-electrolytic organic materials or substances such as boron that will not be dissociated in a neutral region. A reverse osmosis membrane module having the thus treated reverse osmosis membrane element is provided as well.

23 Claims, 3 Drawing Sheets

METHOD OF TREATING REVERSE OSMOSIS MEMBRANE ELEMENT, AND REVERSE OSMOSIS MEMBRANE MODULE

FIELD OF THE INVENTION

The present invention relates to a method of treating a reverse osmosis membrane element used for reducing a solute concentration in a solution, and a reverse osmosis membrane module having the thus treated reverse osmosis membrane element.

BACKGROUND OF THE INVENTION

Some reverse osmosis membranes (RO membranes) according to conventional technology have excellent performance in desalination, water permeability and separation of ionic substances. However, the conventional reverse osmosis membranes cannot provide sufficient rejection of non-electrolytic organic materials such as isopropyl alcohol (IPA) or substances (e.g., boron) that will not be dissociated in a neutral region.

Moreover, performance (e.g., salt rejection) of a conventional reverse osmosis membrane will deteriorate because of change in performance over time or swelling of the reverse osmosis membrane, which is caused by chemicals used for cleaning of the membrane. For temporarily recovering the salt rejection, the reverse osmosis membrane element is contacted with an aqueous solution of a polymer such as polyvinyl methyl ether, tannic acid or the like so as to adsorb the polymer in the surface of the reverse osmosis membrane or clog the surface of the reverse osmosis membrane with the polymer.

However, since the polymers are physically adsorbed or clogged in the surface of the reverse osmosis membrane in the conventional technique, the polymers will be desorbed from the membrane surface over time. Alternatively, the polymers can be desorbed due to chemicals used for cleaning of the membrane. Therefore, it is difficult to maintain the performance of the reverse osmosis membrane element for a long time by treating the membrane according to the conventional technique.

In a process of distillation of seawater by use of such a reverse osmosis membrane, boron is difficult to remove. Recently in Japan, a standard for inspection of distillation facilities was changed. Under this new standard, it is required that boron in seawater is reduced to 1.0 mg/L or less. This target value of 1.0 mg/L cannot be achieved necessarily by using the conventional reverse osmosis membranes, depending on the operation conditions or due to the change in performance of the reverse osmosis membranes.

SUMMARY OF THE INVENTION

An object of the present invention is to provide a method of treating a reverse osmosis membrane in order to maintain for a long time an effect of reducing a solute concentration in a solution. The reverse osmosis membrane will reject even non-electrolytic organic materials or substances such as boron that will not be dissociated in a neutral region.

According to the present invention, a concentration of a solute in a solution can be reduced by operating a membrane separator equipped with a reverse osmosis membrane element having a polyamide skin layer, in which the reverse osmosis membrane element is contacted with a bromide-containing aqueous solution of free chlorine so as to introduce the bromide into the polyamide skin layer.

Specifically in the present invention, a reverse osmosis membrane element is loaded in a pressure vessel in the membrane separator, and then contacted with a bromide-containing aqueous solution of free chlorine.

A reverse osmosis membrane module according to the present invention is equipped with the above-described reverse osmosis membrane element.

In the present invention, a reverse osmosis membrane element has a reverse osmosis membrane and also a raw-water channel provided adjacent to the reverse osmosis membrane. A flat reverse osmosis membrane will be formed like a bag and a channel for passing permeated water is provided inside thereof. The reverse osmosis membrane is wound around the outer surface of a perforated hollow tube so that the interior of the reverse osmosis membrane is connected at one end to the perforated hollow tube.

A reverse osmosis membrane module has a pressure vessel containing one or plural reverse osmosis membrane(s). The reverse osmosis membrane element is required for applying a raw-water pressure so as to carry out separation using the reverse osmosis membrane.

A membrane separator is an apparatus having a controller, a pump, a measuring instrument, a pipe, a bulb, a tank, and the like for operating the reverse osmosis membrane module.

DETAILED DESCRIPTION OF THE INVENTION

Figure 1:
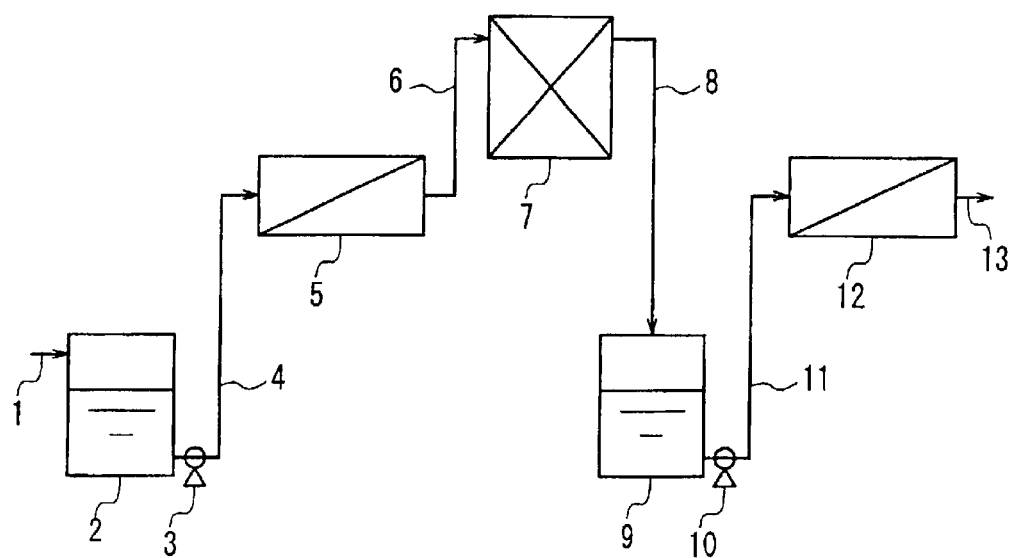
FIG. 1 is a flowchart illustrating an operation process in a reverse osmosis membrane separator in one embodiment of the present invention.

A method of treating a reverse osmosis membrane element according to the present invention includes contacting a reverse osmosis membrane element with a bromide-containing aqueous solution of free chlorine.

A reverse osmosis membrane treated according to the present invention can reject even non-electrolytic organic materials and solutes such as boron, as well as ionic substances. The present invention can recover performance (e.g., salt rejection) of a reverse osmosis membrane, which deteriorates because of change in performance over time or swelling caused by chemicals used for cleaning of the reverse osmosis membrane. Therefore, even an existing membrane separator using a conventional reverse osmosis membrane element can have an improved boron rejection by treating the reverse osmosis membrane according to the present invention. Thereby, a boron concentration in a solution treated with the reverse osmosis membrane can be reduced to 1.0 mg/L or less. Since the chemical treatment in the present invention is carried out using an aqueous solution of free chlorine, the performance of the reverse osmosis membrane will deteriorate less in comparison with a reverse osmosis membrane treated in a conventional technique such as polymer adsorption or clogging. A reverse osmosis membrane treated according to the present invention can reject at least 99.7% of sodium chloride that is contained in raw water at a concentration of 35000 ppm. In other words, the reverse osmosis membrane can reduce a boron concentration in a solution to 1.0 mg/L or less, maintaining its salt rejection as high as the conventional technique.

In the method, it is preferable that a concentration of free chlorine in the aqueous solution is in a range of 1 mg/L to 100 mg/L. When the concentration is 1 mg/L or more, rejection of non-electrolytic organic materials (e.g., IPA) and substances (e.g., boron) that may not be dissociated in a neutral region are improved further. When the concentration is 100 mg/L or less, reduction of the permeable flux can be prevented. It is more preferable that the concentration of the free chlorine is in a range of 5 mg/L to 50 mg/L.

It is preferable that a concentration of the bromide in the aqueous solution is in a range of 0.5 mg/L to 100 mg/L. The bromide concentration of 0.5 mg/L or more serves to raise the rejection of a non-electrolytic organic material and a substance that will not be dissociated in a neutral region. The bromide concentration of 100 mg/L or less can prevent deterioration in the permeable flux. It is more preferable that the concentration of the bromide is in a range of 1 mg/L to 50 mg/L.

It is preferable that pH of the aqueous solution is in a range of 4 to 11. When the pH is 4 or more, the free chlorine is prevented from forming a chlorine gas. When the pH is 11 or less, the bromide can be added more effectively to the polyamide skin layer. It is more preferable that the pH is in a range of 4 to 6.8, and particularly preferably, in a range of 5 to 6.5.

It is preferable that the aqueous solution is desalted water obtained using the reverse osmosis membrane element. Accordingly, the performance (salt rejection) of the reverse osmosis membrane element in an existing separator can be recovered easily.

It is preferable that the treatment according to the present invention is carried out under pressure. A preferred pressure range is from 0.1 MPa to 20 MPa from a viewpoint of efficiency, and more preferably from 0.2 MPa to 10 MPa, and a particularly preferred range is from 0.5 MPa to 6 MPa.

It is preferable in the treatment of a reverse osmosis membrane according to the present invention that the membrane element contains nitrogen, and preferably, has a polyamide or polyamide-containing skin layer. Still preferably, the polyamide skin layer is formed by reacting an aromatic compound having at least two reactive amino groups and a polyfunctional acid halide compound having at least two reactive acid halide groups. Such a reverse osmosis membrane exhibits excellent performance in salt rejection, water permeability and separation of ionic substances. The membrane can reject effectively even non-electrolytic organic materials such as IPA and solutes (e.g., boron) that will not be dissociated in a neutral region.

The present invention further provides a reverse osmosis membrane module having a reverse osmosis membrane element treated in the above-described manner. Such a reverse osmosis membrane module has a high rejection, i.e., the reverse osmosis membrane module can reject ionic substances more effectively than a conventional module can, and furthermore, it can reject even non-electrolytic organic materials and solutes that will not be dissociated in a neutral region.

The treatment method according to the present invention can be applied to any reverse osmosis membrane. Specifically, a reverse osmosis membrane element is loaded in a pressure vessel provided in a membrane separator before preparing a bromide-containing aqueous solution of free chlorine and contacting the solution with the reverse osmosis membrane element. Similarly, the bromide-containing aqueous solution of free chlorine can be contacted with a reverse osmosis membrane element incorporated in an existing membrane separator. Since one or a plurality of reverse osmosis membrane elements can be loaded in a pressure vessel of a membrane separator in the treatment method according to the present invention, the time for treating each reverse osmosis membrane element can be shortened further when the membrane separator becomes larger. This can improve the producibility.

A reverse osmosis membrane element treated according to the present invention can reject ionic substances and even IPA or solutes such as boron effectively. Therefore, the treatment method can be used in a membrane separator having either a new or existing reverse osmosis membrane element in order to improve the performance. In this case, the reverse osmosis membrane element loaded in the separator will have improved rejections for IPA and for any solutes such as boron, while the rejection of the ionic substances will not deteriorate even after the treatment.

An existing membrane separator equipped with a reverse osmosis membrane element will experience reduction of the salt rejection caused by change in performance of the reverse osmosis membrane or swelling of the membrane caused by chemicals used for cleaning. The treatment method according to the present invention can be used for recovering performance of the reverse osmosis membrane. In this case, a reverse osmosis membrane loaded in an existing separator will have higher rejection for ionic substances after the treatment. In other words, the treatment according to the present invention can be used also for improving rejection of ionic substances.

The bromide-containing aqueous solution of free chlorine can be prepared, for example, by dissolving a bromide and free chlorine in water. The bromide is not limited specifically as long as it is soluble in water. The examples include sodium bromide, potassium bromide, lithium bromide, cesium bromide, rubidium bromide, francium bromide, calcium bromide, magnesium bromide, strontium bromide, barium bromide, radium bromide, beryllium bromide, ammonium bromide, cadmium bromide, germanium bromide, cobalt bromide, tungsten bromide, iron bromide, tellurium bromide, copper bromide, manganese bromide, and hydrogen bromide. Among them, preferred examples are a bromide of an alkali metal and a bromide of an alkaline-earth metal. A bromide of an alkali metal is preferred particularly.

The bromide-containing aqueous solution of free chlorine can be prepared from water that contains a bromide (e.g., seawater and subsurface water) or desalted water obtained using a reverse osmosis membrane. Free chlorine is added to the water and, if required, the pH is adjusted to the certain range. Desalted water obtained using a reverse osmosis membrane is preferred in particular for facilitating improvement and recovery in performance of the reverse osmosis membrane loaded in an existing separator.

There is no specific limitation about a reverse osmosis membrane to be treated according to the present invention. Preferably, the membrane has a polyamide skin layer. Preferably, the reverse osmosis membrane has a polyamide skin layer formed by reacting an aromatic compound having at least two reactive amino groups and a polyfunctional acid halide compound having at least two reactive acid halide groups. The reverse osmosis membrane has excellent performance in salt rejection, water permeability and separation of ionic substances, and it has a high rejection for even non-electrolytic organic materials and certain solutes such as boron.

The reverse osmosis membrane can be prepared, for example, by forming a polyamide skin layer on a porous support by reacting an aromatic compound having at least two reactive amino groups and a polyfunctional acid halide compound having at least two reactive acid halide groups.

There is no specific limitation about the aromatic compound having at least two amino groups, which can be described below as 'polyfunctional amine'. The examples include m-phenylenediamine; p-phenylenediamine; 1,3,5-triaminobenzene; 1,2,4-triaminobenzene; 8,5-diaminobenzoic acid; 2,4-diaminotoluene; 2,4-diaminoanisole; amidol; and xylylenediamine. Among the examples, m-phenylenediamine, p-phenylenediamine, and triaminobenzenes are preferred. Particularly, m-phenylenediamine and triaminobenzenes are preferred.

In addition to the aromatic polyfunctional amines, aliphatic/alicyclic polyfunctional amines can be used as a mixture. Examples of the aliphatic polyfunctional amines include ethylenediamine, propylenediamine, and tris(2-diaminoethyl)amine. The examples of the alicyclic polyfunctional amines include: 1,3-diaminocyclohexane; 1,2-diaminocyclohexane; 1,4-diaminocyclohexane; piperazine; 2,5-dimethylpiperazine; and 4-aminomethylpiperazine.

The above-described polyfunctional acid halide (hereinafter described as 'acid halide') is not particularly limited, and the examples include aromatic, aliphatic, and alicyclic polyfunctional acid halides. Aromatic polyfunctional acid halide is preferred.

Examples of the aromatic polyfunctional acid halides include trimesic acid chloride, terephthalic acid chloride, isophthalic acid chloride, biphenyldicarboxylic acid chloride, naphthalenedicarboxylic acid dichloride, benzene trisulfonic acid chloride, benzene disulfonic acid chloride, and chlorosulfonium benzene dicarboxylic acid chloride. Among such halides, monocyclic aromatic compounds are preferred.

Examples of the aliphatic polyfunctional acid halides include propanetricarboxylic acid chloride, butanetricarboxylic acid chloride, pentanetricarboxylic acid chloride, glutaryl halide, and adipoyl halide.

Examples of the alicyclic polyfunctional acid halides include cyclopropanetricarboxylic acid chloride, cyclobutanetetracarboxylic acid chloride, cyclopentanetricarboxylic acid chloride, cyclopentanetetracarboxylic acid chloride, cyclohexanetricarboxylic acid chloride, tetrahydrofurantetracarboxylic acid chloride, cyclopentanedicarboxylic acid chloride, cyclobutanedicarboxylic acid chloride, cyclohexanedicarboxylic acid chloride, and tetrahydrofurandicarboxylic acid chloride.

The porous support is not particularly limited as long as the polyamide skin layer can be supported, and the examples include polysulfone, polyaryl ether sulfones such as polyether sulfone, polyimide and polyvinylidene fluoride. A porous supporting film comprising polysulfone or polyaryl ether sulfone is especially preferable because it is stable chemically, mechanically and thermally. Such a porous support usually has a thickness of about 25 $\mu$m to 125 $\mu$m, and preferably, about 40 $\mu$m to 75 $\mu$m, but the thickness is not necessarily limited to those ranges.

Next, a polyamide skin layer containing crosslinked polyamide as the main component is formed on the porous support by an interfacial polymerization between the polyfunctional amine component and the acid halide component. The process includes, for example, forming a first layer of a solution containing the polyfunctional amine component by coating or the like on the porous support; forming a layer of a solution containing the acid halide component by coating or the like on the first layer; and carrying out an interfacial polycondensation to form a thin film (polyamide skin layer) of a crosslinked polyamide on the porous support.

The solution containing polyfunctional amine can contain a small amount of polymers such as polyvinyl alcohol, polyvinyl pyrrolidone, polyacrylic acid, and/or a polyhydric alcohol such as sorbitol or glycerol in order to facilitate the film formation and improve the performance of the reverse osmosis membranes.

For enhancing the permeation flux, a compound having a solubility parameter of 8–14 $(cal/cm^3)^{1/2}$ can be added to a solution containing polyfunctional amine or/and a solution containing an acid halide component (see JP 08(1996)-224452 A). The solubility parameter is a quantity defined as $(\Delta H/V)^{1/2}$ $(cal/cm^3)^{1/2}$ when a molar evaporative heat of a liquid and a molar volume are represented as $\Delta H cal/mol$ and $V cm^3/mol$ respectively. Substances having the above-described solubility parameters include alcohols, ethers, ketones, esters, halogenated hydrocarbons, and sulfur-containing compounds. Specific examples are described in JP 08(1996)-224452 A.

The amine salts described in JP 02(1990)-187135 A, such as a salt of a tetraalkylammonium halide or a trialkylamine and an organic acid can also be suitably used for the solution(s) containing the polyfunctional amine and/or acid halide so as to facilitate the film formation, improve the absorption of the amine solution in the support, and promote the condensation reaction.

The solution(s) containing the polyfunctional amine and/or acid halide can further contain a surfactant such as sodium dodecylbenzenesulfonate, sodium dodecylsulfonate, and sodiumlaurylsulfonate. Such a surfactant has an effect for improving the wettability of the solution containing the polyfunctional amine for the porous support.

Furthermore, it is effective to use, in the solution(s) containing the polyfunctional amine and/or acid halide, sodium hydroxide or trisodium phosphate capable of removing a hydrogen halide formed by the interfacial reaction or to use an acylation catalyst as a catalyst in order to promote the polycondensation reaction at the interface.

The concentration of the acid halide and that of the polyfunctional amine are not particularly limited for the solution containing the acid halide and the solution containing the polyfunctional amine, but the concentration of the acid halide is usually from 0.01 wt % to 5 wt %, and preferably from 0.05 wt % to 1 wt %. The concentration of the polyfunctional amine is usually from 0.1 wt % to 10 wt %, and preferably, from 0.5 wt % to 5 wt %.

Thus, the solution containing polyfunctional amine is coated on the porous support, and the solution containing a polyfunctional acid halide compound is coated thereon. After the extra solutions are removed, the coated layers are heated and dried, usually at a temperature of about 20° C. to 150° C., preferably about 70° C. to 130° C., for about 1 minute to 10 minutes, preferably about 2 minutes to 8 minutes. Thus, a water-permeable thin film formed of crosslinked polyamide is obtained. The thin film usually has a thickness of about 0.05 $\mu$m to 2 $\mu$m, and preferably, about 0.10 $\mu$m to 1 $\mu$m.

In the treatment method of the present invention, at least one reverse osmosis membrane element having a polyamide skin layer is loaded in a pressure vessel of a membrane separator, and the reverse osmosis membrane elements are contacted with a bromide-containing aqueous solution of free chlorine. As mentioned above, this contacting step is carried out preferably under pressure. From the viewpoint of efficiency in the treatment, the pressure is, for example, from 0.1 MPa to 20 MPa, preferably from 0.2 MPa to 10 MPa, and more preferably, from 0.5 MPa to 6 MPa.

When contacting the free chlorine aqueous solution containing the bromide to the reverse osmosis membrane elements, the solution can be flown through the reverse osmosis membrane elements for, e.g., 5 minutes to 120 minutes, or preferably for 15 minutes to 60 minutes. When the time is 5 minutes or more, the rejection for the non-electrolytic organic materials and substances such as boron will be improved further. When the time is 120 minutes or less, reduction of the permeation flux can be prevented.

An example of reverse osmosis membrane treated according to the present invention has a polyamide skin layer to which bromide atoms are added. Chlorine atoms can be added to the polyamide skin layer as well. The bromide in the polyamide skin layer can be checked using electron spectroscopy (ESCA) or the like.

The bromide in the polyamide skin layer can be atomic or ionic. Substance(s) other than the bromide can be added to the polyamide skin layer as long as the effect of the invention is not inhibited. It is preferable that the bromide is added to the aromatic compound in the polyamide skin layer.

It is preferable for a polyamide skin layer of a reverse osmosis membrane treated according to the present invention that an atomic ratio (Br/N) is from 0.1 to 1.0 when Br denotes bromine in a bromide and N denotes nitrogen composing the amino group, though the ratio can vary depending on the condition in the reaction for forming the polyamide skin layer. When the atomic ratio is within in this range, the non-electrolytic organic materials and the substances such as boron can be rejected further effectively. In addition, when the ratio is 1.0 or less, excess reduction of the permeation flux and excess increase of the operation pressure can be prevented, resulting in cost reduction. A more preferable range for the ratio is from 0.15 to 0.7, and a still more preferable range is from 0.2 to 0.5.

For the above described reasons, reverse osmosis membrane modules provided with reverse osmosis membrane elements treated according to the present invention can be used for various purposes such as distillation of brackish water or seawater, production of ultra-pure water. The module can be used also for removal of contaminants and recovering effective materials from industrial waste water contaminated due to a dyeing process or an electrodeposition painting process so as to prevent waste water from flowing into the environment. Further, the module can be used also for condensation of active principles for foods, and removal of toxic ingredients from waterworks and sewers.

As described above, the treatment method according to the present invention can shorten the time required for treating each reverse osmosis membrane element. In addition, since an aqueous solution of free chlorine is used for chemical treatment of the element, deterioration in performance of the reverse osmosis membrane, which is caused by desorption of an agent, can be suppressed when compared with the cases of conventional treatment including adsorption of a polymer aqueous solution or clogging. Therefore, the treatment method can be used for improving the performance of the reverse osmosis membrane element and also for recovering the performance of the membrane after an operation of a membrane separator.

The reverse osmosis membrane element treated as mentioned above has excellent performance in salt rejection, water permeability and separation of ionic substances. Moreover, the element can reject even non-electrolytic organic materials and substances that is nondissociative in a neutral region. The element is particularly suitable for desalination of seawater, since it can remove total dissolved solid (TDS) and furthermore, it can remove boron that is not dissociated in a neutral region and thus difficult to remove.

Next, the present invention will be described by referring to FIGS. 1–3. FIG. 1 is a flowchart for illustrating an operation process in a reverse osmosis membrane separator in one embodiment according to the present invention. Raw water 1 is once reserved in a tank 2, and fed by a feeding pump 3 to a first reverse osmosis membrane module 5. After permeating the reverse osmosis membrane module 5, the water is fed to a $CO_2$-removing tank 7 through a line 6 and reserved in the tank 7, from which $CO_2$ is removed by air bubbling or the like. Subsequently, the thus treated water is fed through a pipe 8 to a tank 9 and reserved in the tank 9. The water is further fed to a second reverse osmosis membrane module 12 through a feeding pump 10, and taken out through a line 13.

Figure 2:
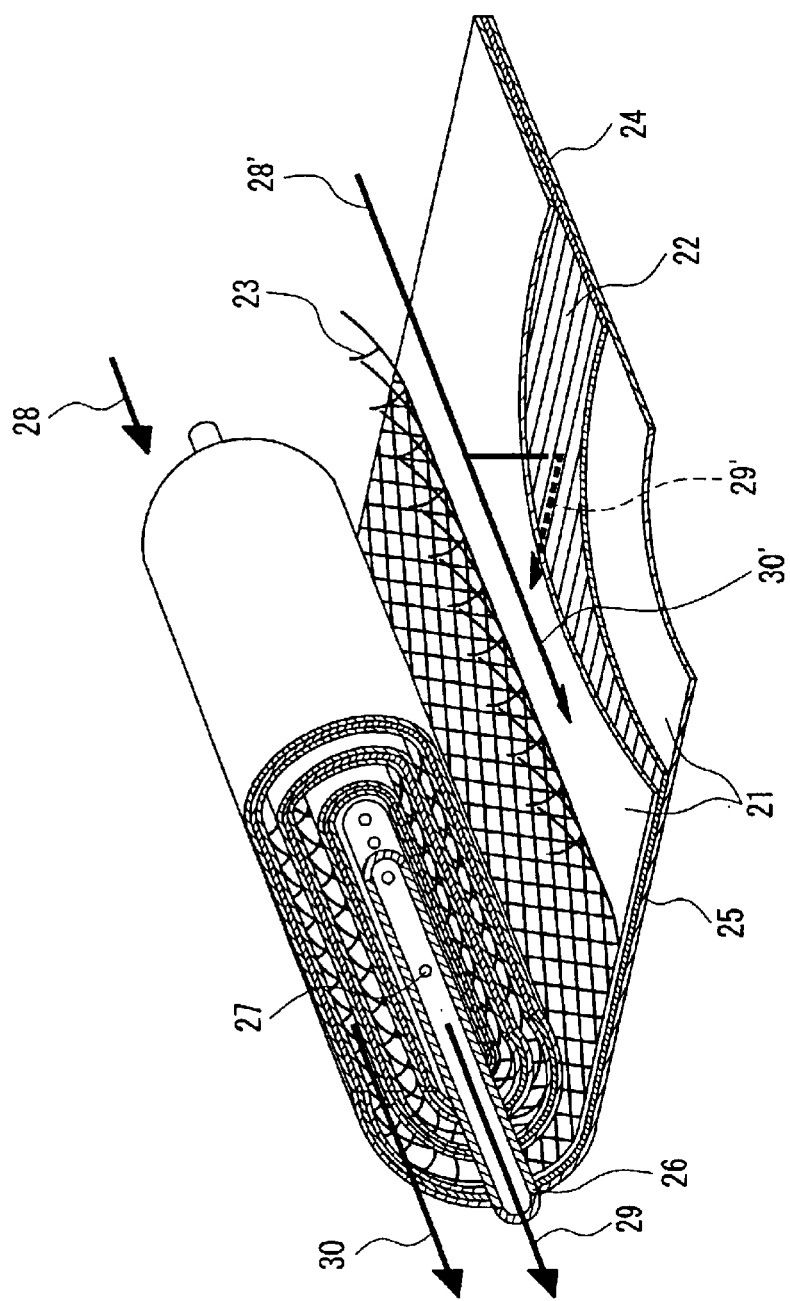
FIG. 2 is perspective view for illustrating a structure of a reverse osmosis membrane element in one embodiment of the present invention.

FIG. 2 is perspective view for illustrating a structure of a reverse osmosis membrane element in one embodiment of the present invention. A reverse osmosis membrane 21 sandwiching a permeate spacer 22 is sealed at the peripheries. Numerals 24 and 25 denote sealed portions. The thus sealed reverse osmosis membranes are wound around a core tube 26 with a feed spacer 23. The core tube 26 has numbers of pores 27. Raw water (feed water) is fed from the directions indicated with arrows 28, 28' to the feed spacer 23. The water permeates the reverse osmosis membrane 21 and proceeds in the directions indicated with arrows 29 and 29', before being taken out from the core tube 26 through the pores 27. Water that cannot permeate the reverse osmosis membrane 21 (i.e., concentrated water) is discharged in the directions indicated with arrows 30 and 30'.

Figure 3:
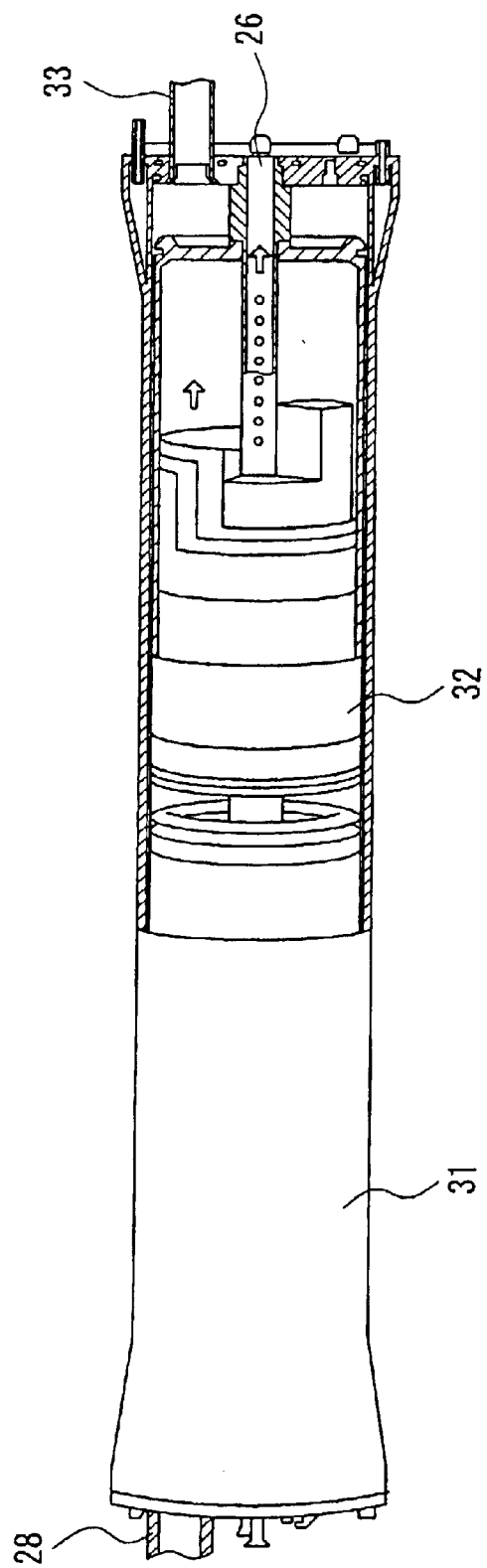
FIG. 3 is a partially-sectional view of a reverse osmosis membrane module in one embodiment of the present invention.

FIG. 3 is a partially-sectional view of a reverse osmosis membrane module in one embodiment of the present invention. At least one reverse osmosis membrane element 32 is loaded in a pressure vessel 31. Raw water (feed water) is fed from a direction indicated with an arrow 28. Permeated water is taken out from a core tube 26, while the remainder (concentrated water) is discharged from a discharge tube 33.

EXAMPLES

Particular examples of the present invention will be described below in more detail. The present invention is not restricted to the following examples.

An aqueous solution containing m-phenylenediamine (3 wt %), sodium laurylsulfate (0.25 wt %), triethylamine (2 wt %), camphor sulfonic acid (4 wt %) was coated on a porous support (polysulfone-based ultrafiltration membrane), and subsequently, any extra aqueous solution was removed to form a layer of the aqueous solution on the porous support. Then, an isooctane solution containing trimesic acid chloride (0.1 wt %) and isophthalic acid chloride (0.15 wt %) was coated on this layer, and the porous support coated with the solution was retained for 3 minutes in a dryer at a temperature of 120° C. so as to form a polymer thin film (polyamide skin layer), and thus a reverse osmosis membrane was obtained. In this reverse osmosis membrane, the porous support had an average thickness of 50 $\mu$m and the polyamide skin layer had an average thickness of 0.2 $\mu$m.

Example 1

Six reverse osmosis membrane elements were loaded in series in a pressure vessel of a membrane separator for distillation of seawater. Each of the reverse osmosis membrane elements had a polyamide skin layer exhibiting salt rejection of 99.7% and a water permeate flow of 15 m³/day in an evaluation under a condition of pressure of 5.49 MPa and a concentrated water flow of 90 L/min. by using a 25° C. aqueous solution containing 3.5 wt % NaCl having a pH of 6.5. Each element was 201 mm in diameter and 1016 mm in length. Seawater distilled using the reverse osmosis membrane elements had TDS at a concentration of 150 mg/L. The water was further adjusted to have free chlorine of 20 mg/Lm, sodium bromide of 20 mg/L and a pH of 6.0, and fed to the reverse osmosis membrane elements at an operation pressure of 1.5 MPa for 30 minutes. This treatment will be described below as a 'RO membrane treatment'.

For the skin layer of the thus treated reverse osmosis membrane element, the components were examined using ESCA (electron spectroscopy for chemical analysis). According to the examination, an atomic ratio of Br/N was 0.27. Here, Br denotes bromine in a bromide and N denotes nitrogen in the amino group.

The thus treated reverse osmosis membrane elements were fed with seawater. The seawater had a TDS concentration of 3.5 wt %, 4.7 mg/L of boron, a pH of 6.8 and the temperature was 26° C. In the operation, the water permeate flow was 90 m³/day and the recovery rate (the amount of water obtained from the fed water) was 40%. The treated water had TDS of 100 mg/L and a boron concentration of 0.4 mg/L.

Comparative Example 1

Six reverse osmosis membrane elements were loaded in series in a pressure vessel of a membrane separator for distillation of seawater. Each of the reverse osmosis membrane elements had a polyamide skin layer exhibiting salt rejection of 99.7% and a water permeate flow of 15 m³/day in an evaluation under a condition of pressure of 5.49 MPa and a concentrated water flow of 90 L/min. by using a 25° C. aqueous solution containing 3.5 wt % NaCl having a pH of 6.5. Each element was 201 mm in diameter and 1016 mm in length.

The membrane separator was fed with seawater, without the RO membrane treatment described in Example 1. The seawater had a TDS concentration of 3.5 wt %, 4.7 mg/L of boron, a pH of 6.8 and the temperature was 26° C. In the operation, the water permeate flow was 90 m³/day and the recovery rate was 40%. The treated water had TDS of 150 mg/L and boron of 0.7 mg/L.

Example 2

A membrane separator used for distillation had 5 reverse osmosis membrane elements loaded in series, and the water permeate flow and the recovery rate were 70 m³/day and 40% respectively. The reverse osmosis membrane elements were fed with seawater having a TDS concentration of 3.5 wt %, 4.7 mg/L boron, and a pH of 6.8 at a temperature of 26° C. Salt rejection of the reverse osmosis membrane elements deteriorated because of change in performance or swelling of the reverse osmosis membranes caused by chemicals used for cleaning of the membranes. The reverse osmosis membrane elements were treated by feeding water (TDS concentration: 300 mg/L) distilled by using the reverse osmosis membrane elements for 30 minutes at an operation pressure of 1.5 MPa, after adjusting the water to have a free chlorine concentration of 20 mg/L, sodium bromide concentration of 20 mg/L, and a pH of 6.0.

For the skin layer of the thus treated reverse osmosis membrane elements, the components were checked using ESCA. An atomic ratio (Br/N) of bromine in the bromide to nitrogen in the amino group was 0.15.

After the treatment, distillation of seawater was resumed for analyzing the thus obtained water. In the analysis, TDS was 250 mg/L and the boron concentration was 0.9 mg/L. This indicates that the water quality was improved, since the water before the treatment had TDS of 300 mg/L and boron of 1.3 mg/L.

The above-mentioned results show that the reverse osmosis membrane element treated according to the present invention had remarkable rejection for ionic substances such as salts and even for some substances such as boron that will not be dissociated in a neutral region.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, all changes that come within the meaning and range of equivalency of the claims are intended to be embraced therein.

What is claimed is:

1. A method of treating a reverse osmosis membrane element, comprising:

loading the reverse osmosis membrane element in a pressure vessel provided in a membrane separator, and contacting the reverse osmosis membrane element with a bromide-containing aqueous solution of free chlorine, wherein the membrane element has a polyamide or polyamide-containing skin layer, and wherein an atomic ratio of Br/N is from 0.1 to 1.0 when Br denotes bromine in the bromide introduced into the polyamide or polyamide-containing skin layer and N denotes nitrogen composing an amino group of the polyamide or polyamide-containing skin layer.

2. The method of treating a reverse osmosis membrane element according to claim 1, wherein a concentration of the free chlorine in the aqueous solution is from 1 mg/L to 100 mg/L.

3. The method of treating a reverse osmosis membrane element according to claim 1, wherein a concentration of the bromide in the aqueous solution is from 0.5 mg/L to 100 mg/L.

4. The method of treating a reverse osmosis membrane element according to claim 1, wherein the bromide is at least one compound selected from the group consisting of sodium bromide, potassium bromide, lithium bromide, cesium bromide, rubidium bromide, francium bromide, calcium bromide, magnesium bromide, strontium bromide, barium bromide, radium bromide, beryllium bromide, ammonium bromide, cadmium bromide, germanium bromide, cobalt bromide, tungsten bromide, iron bromide, tellurium bromide, copper bromide, manganese bromide, and hydrogen bromide.

5. The method of treating a reverse osmosis membrane element according to claim 1, wherein the membrane element contains nitrogen.

6. The method of treating a reverse osmosis membrane element according to claim 1, wherein the aqueous solution has a pH in a range of 4 to 11.

7. The method of treating a reverse osmosis membrane element according to claim 1, wherein the aqueous solution is prepared by adding free chlorine to desalted water that is obtained by using the reverse osmosis membrane element.

8. The method of treating a reverse osmosis membrane element according to claim 1, wherein the contacting process is carried out under pressure.

9. The method of treating a reverse osmosis membrane element according to claim 8, wherein the pressure is from 0.1 MPa to 20 MPa.

10. The method of treating a reverse osmosis membrane element according to claim 1, wherein the polyamide skin layer is formed by reacting an aromatic compound having at least two reactive amino groups and a polyfunctional acid halide compound having at least two reactive acid halide groups.

11. A method of treating a reverse osmosis membrane element, comprising:

loading the reverse osmosis membrane element in a pressure vessel provided in a membrane separator, and contacting the reverse osmosis membrane element with a bromide-containing aqueous solution of free chlorine to provide bromide to said membrane, wherein the reverse osmosis membrane element has a sodium chloride rejection of at least 99.7% and provides water containing boron of at most 1.0 mg/L from raw water containing at least 35000 ppm of sodium chloride and boron of a concentration over 1.0 mg/L.

12. A reverse osmosis membrane module equipped with a reverse osmosis membrane element, wherein the reverse osmosis membrane element is a high rejection reverse osmosis membrane element having a polyamide or polyamide-containing skin layer and obtained by loading the reverse osmosis membrane element in a pressure vessel provided in a membrane separator, and contacting the reverse osmosis membrane element with a bromide-containing aqueous solution of free chlorine wherein an atomic ratio of Br/N is from 0.1 to 1.0 when Br denotes bromine in the bromide introduced into the polyamide or polyamide-containing skin layer and N denotes nitrogen composing an amino group of the polyamide or polyamide-containing skin layer.

13. The reverse osmosis membrane module according to claim 12, wherein the bromide is at least one compound selected from the group consisting of sodium bromide, potassium bromide, lithium bromide, cesium bromide, rubidium bromide, francium bromide, calcium bromide, magnesium bromide, strontium bromide, barium bromide, radium bromide, beryllium bromide, ammonium bromide, cadmium bromide, germanium bromide, cobalt bromide, tungsten bromide, iron bromide, tellurium bromide, copper bromide, manganese bromide, and hydrogen bromide.

14. The reverse osmosis membrane module according to claim 12, wherein the membrane element contains nitrogen.

15. The reverse osmosis membrane module according to claim 12, wherein the aqueous solution has a pH in a range of 4 to 11.

16. The reverse osmosis membrane module according to claim 12, wherein the aqueous solution is prepared by adding free chlorine to desalted water that is obtained by using the reverse osmosis membrane element.

17. The reverse osmosis membrane module according to claim 12, wherein the contacting process is carried out under pressure.

18. The reverse osmosis membrane module according to claim 17, wherein the pressure is from 0.1 MPa to 20 MPa.

19. The reverse osmosis membrane module according to claim 12, wherein the polyamide skin layer is formed by reacting an aromatic compound having at least two reactive amino groups and a polyfunctional acid halide compound having at least two reactive acid halide groups.

20. The reverse osmosis membrane module according to claim 12, wherein the reverse osmosis membrane element is used for distillation of seawater.

21. The reverse osmosis membrane module according to claim 12, wherein a concentration of the free chlorine in the aqueous solution is from 1 mg/L to 100 mg/L.

22. The reverse osmosis membrane module according to claim 12, wherein a concentration of the bromide in the aqueous solution is from 0.5 mg/L to 100 mg/L.

23. A reverse osmosis membrane module equipped with a reverse osmosis membrane element, wherein the reverse osmosis membrane element is a high rejection reverse osmosis membrane element obtained by loading the reverse osmosis membrane element in a pressure vessel provided in a membrane separator, and contacting the reverse osmosis membrane element with a bromide-containing aqueous solution of free chlorine to provide bromide to said membrane, wherein the reverse osmosis membrane element has a sodium chloride rejection of at least 99.7% and provides water containing boron of at most 1.0 mg/L from raw water containing at least 35000 ppm of sodium chloride and boron of a concentration over 1.0 mg/L.

* * * * *